United States Patent
Li et al.

(10) Patent No.: US 11,501,523 B2
(45) Date of Patent: Nov. 15, 2022

(54) GOODS SENSING SYSTEM AND METHOD FOR GOODS SENSING BASED ON IMAGE MONITORING

(71) Applicant: SHANGHAI CLOUDPICK SMART TECHNOLOGY CO., LTD., Shanghai (CN)

(72) Inventors: Tingtao Li, Shanghai (CN); Linan Feng, Shanghai (CN); Ding Xia, Shanghai (CN); Jieyu Ma, Shanghai (CN); Wenyao Wu, Shanghai (CN); Yimei Zhang, Shanghai (CN)

(73) Assignee: Shanghai Cloudpick Smart Technology Co., Ltd., Shanghai (CN)

( * ) Notice: Subject to any disclaimer, the term of this patent is extended or adjusted under 35 U.S.C. 154(b) by 0 days.

(21) Appl. No.: 16/812,032

(22) Filed: Mar. 6, 2020

(65) Prior Publication Data

US 2020/0202137 A1   Jun. 25, 2020

Related U.S. Application Data

(63) Continuation of application No. PCT/CN2018/117326, filed on Nov. 23, 2018.

(30) Foreign Application Priority Data

Jan. 26, 2018 (CN) .......................... 201810078256.2

(51) Int. Cl.
*G06K 9/00* (2006.01)
*G06N 3/04* (2006.01)
(Continued)

(52) U.S. Cl.
CPC .......... *G06V 10/757* (2022.01); *A47F 5/0025* (2013.01); *G01G 19/52* (2013.01);
(Continued)

(58) Field of Classification Search
CPC ............. G06K 9/6211; G06K 9/00771; G06K 9/3241; G06K 9/00369; G06K 9/00201;
(Continued)

(56) References Cited

U.S. PATENT DOCUMENTS

| 6,711,293 B1 * | 3/2004 | Lowe | G06K 9/4671 |
| | | | 382/219 |
| 2009/0063306 A1 * | 3/2009 | Fano | G06Q 10/087 |
| | | | 705/28 |

(Continued)

FOREIGN PATENT DOCUMENTS

| CN | 105518734 A | 4/2016 |
| CN | 105719188 A | 6/2016 |

(Continued)

OTHER PUBLICATIONS

International Search Report to PCT Application No. PCT/CN2018/117326 dated Mar. 4, 2019, (4p).

(Continued)

*Primary Examiner* — Sath V Perungavoor
*Assistant Examiner* — Tyler B Edwards
(74) *Attorney, Agent, or Firm* — Arch & Lake LLP

(57) ABSTRACT

A goods sensing system includes: a sample collector that collects a plurality of sets of image samples, where each set of the image samples comprise sample images of a type of goods at multiple angles, where a set of the image samples of a same type of goods are provided with a same group identification, and the group identification is the type of the goods corresponding to the set of image samples; a model trainer that trains a convolutional neural network model according to each sample image and a group identification of the sample image to obtain a goods identification model; a real-time image collector that continuously acquires at least one real-time image of space in front of a shelf, each (Continued)

real-time image including part or all of images of goods; and a goods category deriver that obtains a type and quantity of the goods displayed in the real-time.

18 Claims, 10 Drawing Sheets

(51) Int. Cl.
    *H04W 4/35*     (2018.01)
    *G06V 10/75*     (2022.01)
    *G06Q 10/08*     (2012.01)
    *G06Q 30/06*     (2012.01)
    *A47F 5/00*     (2006.01)
    *G01G 19/52*     (2006.01)
    *G06Q 20/20*     (2012.01)
    *G06V 10/20*     (2022.01)
    *G06V 20/52*     (2022.01)

(52) U.S. Cl.
    CPC .............. *G06N 3/04* (2013.01); *G06Q 10/087* (2013.01); *G06Q 20/206* (2013.01); *G06Q 20/208* (2013.01); *G06Q 30/0639* (2013.01); *G06V 10/255* (2022.01); *H04W 4/35* (2018.02); *G06V 20/52* (2022.01)

(58) Field of Classification Search
    CPC ........... G06K 2209/27; G06K 2209/40; G06K 9/00664; G06K 9/00624; G06K 9/2054; G06K 9/4604; G06K 9/6267; A47F 5/0025; A47F 2010/025; G01G 19/52; G01G 19/42; G01G 19/4144; G01G 19/00; G06Q 20/206; G06Q 20/208; G06Q 10/087; G06Q 30/0639; G06Q 30/02; G06Q 10/0875; G06Q 30/06; H04W 4/35; H04W 4/33; G06N 3/04; G06N 3/0454; G06N 3/08; G07G 1/0063; G07G 1/009; G07G 1/14; G07G 1/0018; G07G 1/0036; G07G 1/0009; G07G 1/12; G06F 16/587; G06F 16/22; G06F 16/2379; G07C 9/32; G07C 9/38; G01V 7/00

See application file for complete search history.

(56) References Cited

U.S. PATENT DOCUMENTS

| | | | |
|---|---|---|---|
| 2014/0201041 | A1 | 7/2014 | Meyer |
| 2015/0012396 | A1 | 1/2015 | Puerini et al. |
| 2015/0127496 | A1 | 5/2015 | Marathe et al. |
| 2017/0061258 | A1 | 3/2017 | Chen et al. |
| 2017/0178060 | A1* | 6/2017 | Schwartz .............. G06K 9/6267 |
| 2017/0286773 | A1 | 10/2017 | Skaff et al. |
| 2018/0182039 | A1 | 6/2018 | Wang et al. |
| 2019/0138986 | A1 | 5/2019 | Puerini et al. |
| 2019/0156276 | A1* | 5/2019 | Fisher .................. G06Q 10/087 |
| 2019/0156277 | A1* | 5/2019 | Fisher .................. G06N 3/0454 |
| 2019/0172039 | A1 | 6/2019 | Kambara et al. |

FOREIGN PATENT DOCUMENTS

| | | | | |
|---|---|---|---|---|
| CN | 105787490 | A | 7/2016 | |
| CN | 106326852 | A | 1/2017 | |
| CN | 106781121 | A * | 5/2017 | ........... G06Q 20/208 |
| CN | 106781121 | A | 5/2017 | |
| CN | 106934692 | A | 7/2017 | |
| CN | 107045641 | A | 8/2017 | |
| CN | 107341523 | A | 11/2017 | |
| CN | 107403332 | A * | 11/2017 | |
| CN | 107403332 | A | 11/2017 | |
| CN | 108520194 | A | 9/2018 | |
| CN | 108780596 | A | 11/2018 | |
| EP | 3422309 | A1 | 1/2019 | |
| EP | 3761281 | A1 | 1/2021 | |
| JP | 3213696 | B2 | 10/2001 | |
| JP | 3837475 | B2 | 10/2006 | |
| JP | 2016058106 | A | 4/2016 | |
| JP | 2017157216 | A | 9/2017 | |
| JP | 2021511554 | A | 5/2021 | |
| KR | 20100136089 | A | 12/2010 | |
| KR | 20140136089 | A | 11/2014 | |
| WO | 2017150590 | A1 | 9/2017 | |
| WO | 2019107157 | A1 | 6/2019 | |
| WO | WO2019107157 | A1 | 11/2020 | |

OTHER PUBLICATIONS

Examination Report of Australian Application No. 2018405072 dated Feb. 17, 2021, (8p).

VS Amazon Go, (6p).

Yonghao Liu, Wanfang Data master thesis, "Research on Shelf Commodity Detection Technology Based on Deep Learning", http://d.wanfangdata.com.cn/thesis/Y3246811, Zhejiang University dated Jun. 29, 2020, (78p).

Sooyong Jeong, et al., "DBPIA, The Application of Deep Learning for Image Attribute Recognition and Classification", Korea Information Science Society, http://www.dbpia.co.kr/journal/articleDetail? nodeld=NODE07322329, (4p).

Hsueh, Chenche et al., "With the construction of an all-around 3D model using multiple RGB-D cameras research on application to data set generation for object recognition learning", Graduate School of Systems and Information Engineering, University of Tsukuba, National Institute of Advanced Industrial Science and Technology, Nov. 16, 2021, (5p).

Yang, Xiaoli, "Financing About the Internet" 1st edition, Beijing China Railway Press, [retrieved on Jul. 3, 2020], https://www.taobao.com/list/item/562392841322.htm, (2p).

PCT Search Report of PCT/CN2018/117326 dated Mar. 4, 2019 (14p).

Australian Examination Report of Australian Application No. 2018405072 dated Feb. 17, 2021, (8p).

Extended European Search Report of EP Application No. 18902417.7 dated Feb. 18, 2021, (11p).

First Office Action of Chinese Application No. 201810078256.2 dated Jul. 3, 2020, (8p).

Second Office Action of Chinese Application No. 201810078256.2 dated Mar. 29, 2021, (8p).

Third Office Action of Chinese Application No. 201810078256.2 dated Jul. 12, 2021, (11p).

Fourth Office Action of Chinese Application No. 201810078256.2 dated Oct. 21, 2021, (12p).

* cited by examiner

GOODS SENSING SYSTEM AND METHOD FOR GOODS SENSING BASED ON IMAGE MONITORING

CROSS REFERENCE TO RELATED APPLICATIONS

This application is a continuation application of International Patent Application No. PCT/CN2018/117326 filed on Nov. 23, 2018, which in turn claims priority to Chinese Patent Application No. 201810078256.2 filed on Jan. 26, 2018, the entire contents of which are incorporated herein by reference for all purposes.

FIELD

The disclosure relates to a goods sensing technology for retail industry, in particular to a goods sensing system and a method for goods sensing based on image monitoring in autonomous stores.

BACKGROUND

In the traditional retail industry, each supermarket or convenience store needs special salesmen and cashiers, and the labor cost is high. With the development of electronic payment technology, identity-aware technology and cloud computing technology, unmanned supermarket projects have high feasibility technically. In the unmanned supermarket project, a basic problem to be urgently solved is the judgment and recording problem of goods selected and purchased by a customer, and specifically, a server needs to accurately judge the types of goods taken by the customer from a shelf, the quantity and unit price of the taken goods, so as to automatically settle accounts for the customer.

An RFID technology may be used to sense goods selected and purchased by customers. The mode needs to set an RFID label on each goods, and an RFID reader-writer is set at an entrance guard. The mode has the following disadvantages. Firstly, the hardware cost is higher. The price of each RFID label is about 0.5-1 CNY, the label can increase the cost of each good, and the competitiveness of a supermarket is reduced; and for the goods with the cost of 5 yuan, the cost of the goods with the cost of 5 yuan is increased by 10-20 percent. Secondly, the possibility that the goods are shielded and removed exists in the goods sensing, such as the phenomenon that the RFID reader is shielded by the customer, and thus the goods are lost. And thirdly, the settlement can be achieved only at the supermarket entrance guard, and if the customer eats the edible goods before leaving the store and leaves the package in the supermarket, the RFID reader cannot sense and determine the real consumption amount of the customer. That is, the program highly depends on the self-discipline and moral level of the citizens, rather than using technology to constrain them. Such unmanned supermarkets have a greater risk in the business process.

SUMMARY

The disclosure provides a goods sensing system based on image monitoring, a method for goods sensing and a goods sensing apparatus.

According to a first aspect of the disclosure, there is provided a goods sensing system based on image monitoring, including: a sample collector that collects a plurality of sets of image samples, where each set of the image samples include a plurality of sample images of a type of goods at multiple angles, where a set of the image samples of a same type of goods are provided with a same group identification, and the group identification is the type of the goods corresponding to the set of image samples; a model trainer that trains a convolutional neural network model according to each sample image in the plurality of sets of the image samples and a group identification of the sample image to obtain a goods identification model; a real-time image collector that continuously acquires at least one real-time image of space in front of a shelf, where each real-time image includes part or all of images of goods; and a goods category deriver that obtains a type and quantity of the goods displayed in the real-time image according to the real-time image and the goods identification model.

According to a second aspect of the disclosure, there is provided a method for goods sensing based on image monitoring, including: collecting a plurality of sets of image samples, where each set of the image samples include a plurality of sample images of a type of goods at multiple angles, where a set of image samples of a same type of goods are provided with a same group identification, and the group identification is the type of the goods corresponding to the set of image samples; training a convolutional neural network model according to each sample image in the plurality of sets of the image samples and a group identification of the sample image to obtain a goods identification model; continuously acquiring at least one real-time image of space in front of a shelf, where each real-time image includes a part or all of images of goods; and obtaining type and quantity of the goods displayed in the real-time image according to the real-time image and the goods identification model.

According to a third aspect of the disclosure, there is provided a goods sensing apparatus, including: a processor; and a memory configured to store instructions executable by the processor; where the processor, upon execution of the instructions, is configured to collect a plurality of sets of image samples, where each set of the image samples include a plurality of sample images of a type of goods at multiple angles, where a set of the image samples of a same type of goods are provided with a same group identification, and the group identification is the type of the goods corresponding to the set of image samples; train a convolutional neural network model according to each sample image in the plurality of sets of the image samples and a group identification of the sample image to obtain a goods identification model; continuously acquire at least one real-time image of space in front of a shelf, where each real-time image includes part or all of images of goods; and obtain a type and quantity of the goods displayed in the real-time image according to the real-time image and the goods identification model.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description, in which.

DETAILED DESCRIPTION

Figure 1:
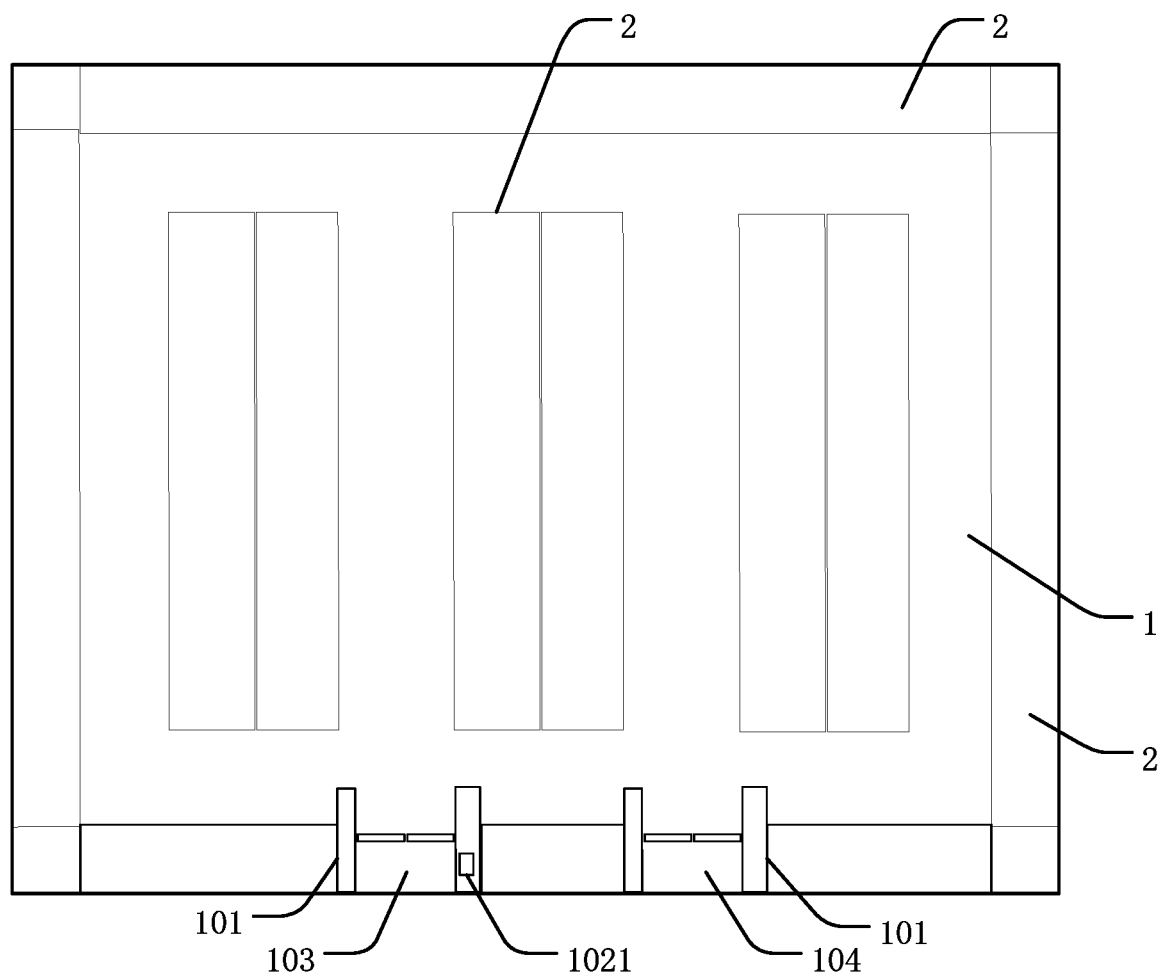
FIG. 1 is a top view of an unmanned supermarket according to an example of the disclosure.

Examples will be described in detail herein with the illustrations thereof expressed in the drawings. The implementations described in the following examples do not represent all implementations consistent with the present disclosure. On the contrary, they are examples of an apparatus and a method consistent with some aspects of the present disclosure.

In the drawings, elements having the same structure are denoted by the same reference numerals, and elements having similar structures or functions are denoted by similar reference numerals. The directional terms, such as upper, lower, front, rear, left, right, inner, outer, upper, lower, side, top, bottom, front, rear, end, etc., used in the disclosure are only used for explanation and illustration, and are not intended to limit the scope of the disclosure.

When a component is described as being "on" another component, it can be directly on the other component; there may also be an intermediate component, the component being disposed on the intermediate component and the intermediate component being disposed on the other component. When a component is referred to as being "mounted to" or "connected to" another component, it is to be understood that the component is directly "mounted to" or "connected to" the other component or that the component is indirectly "mounted to" or "connected to" the other component through an intermediate component.

Figure 2:
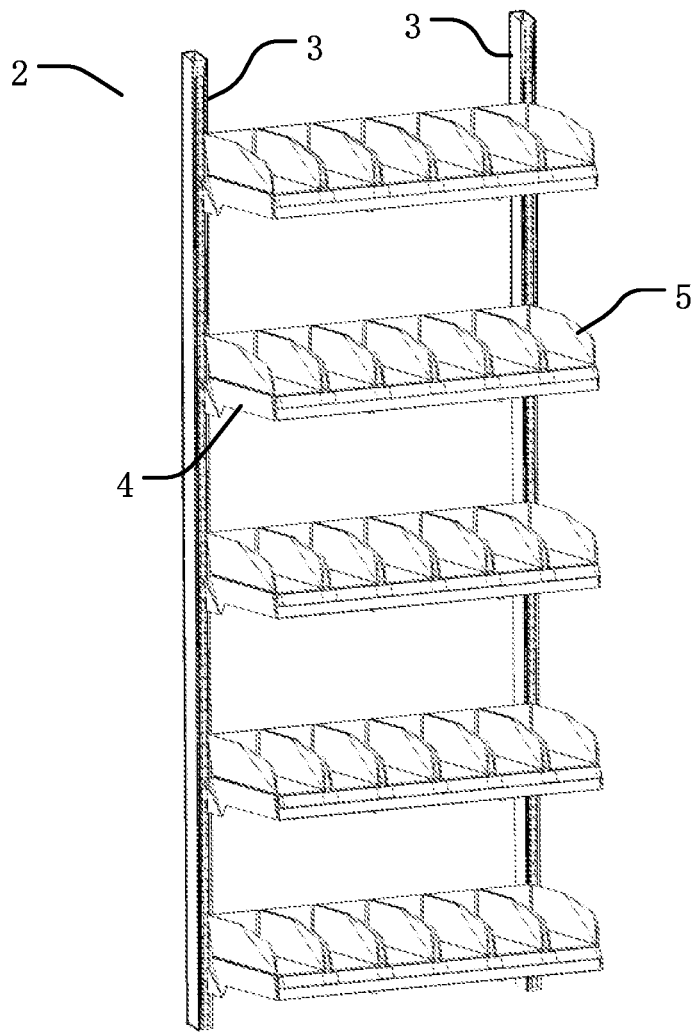
FIG. 2 is a schematic structural view of an overall structure of a shelf according to an example of the disclosure.

The implementations of the disclosure relate to a goods sensing system based on image monitoring, which is a part of an unmanned vending system for an unmanned supermarket. Referring to FIGS. 1 to 2, the unmanned vending system includes a closed space 1, in which a plurality of shelves 2 are disposed, each shelf 2 includes a bracket 3 and a plurality of trays 4 detachably mounted on the bracket 3, and the plurality of trays 4 are parallel to each other at different heights or are flush with each other at the same height. Each tray 4 is provided with a plurality of rack 5 set in parallel, and at least one type of goods is placed on each rack 5. In this example, the goods placed on the rack 5 are required to be easily taken out or put back by the customer, and thus, the end of the rack 5 facing the customer is used as the front end of the rack 5. Each rack 5 is an open box body, and can be placed with one or more types of goods, the goods are standard goods, and the appearance and weight of the same type of goods are the same or similar.

The example further includes a data processing equipment 7, such as a server or a computer. The data processing equipment 7 is internally provided with a plurality of data processing software, has a plurality of functional modules, and can be connected to a plurality of hardware through data lines, so as to implement a plurality of functions in a manner of combining the software and the hardware.

Figure 3:
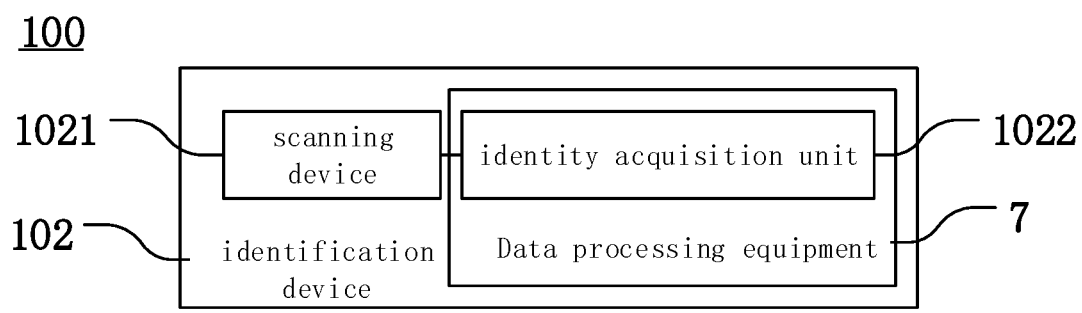
FIG. 3 is a structural block diagram of a customer identity recognition system according to an example of the disclosure.

Referring to FIG. 1 and FIG. 3, the example further includes a customer identity recognition system 100 for identifying the identity information of each customer. The customer identity recognition system 100 includes a door access device 101 and an identification device 102. In this example, the closed space 1 is not an absolutely sealed space, but a relatively sealed space, and the closed space 1 is provided with one or more entrances and exits, e.g., a customer entrance 103 and a customer exit 104, where all customers enter the closed space 1 through the customer entrance 103 and leave the closed space 1 through the customer exit 104.

Each entrance and exit of the enclosed space 1 are provided with an access control device 101, e.g., an automatic gate. The identification device 102 is used for acquiring the identity information of the customer, and comprises a scanning device 1021 connected to the data processing equipment 7 and an identity acquiring unit 1022 in the data processing equipment 7. The scanning device 1021 is set inside or outside of the access control device 101 at the customer entrance 103, e.g., set on the outer surface of the automatic gate, and is used for scanning the identification code, e.g., the two-dimensional code; the identity acquiring unit 1022 is a functional module in the data processing equipment 7, and can acquire the identity information of the customer according to the identity identification code. The access control device 101 at the customer exit 104 needs not be provided with the identification device 102.

In this example, each customer downloads a dedicated Application (APP) in cooperation with an unmanned supermarket to a mobile communication terminal (a mobile phone, a tablet, etc.), registers an account in the Application (APP), and associates the account with payment software; or each customer downloads payment software (such as WeChatPay/AliPay) into the mobile communication terminal, a small program matched with the unmanned supermarket is embedded into the payment software, an account is registered in the payment software, and customer registration information and electronic payment information including customer identity information, bank account information, payment passwords and etc. are included in the special application software (APP) or the payment software. After the registration is completed, the customer identity information is stored in the customer database of the data processing equipment 7.

Application software (APP) in the mobile communication terminal may generate a two-dimensional code, the two-dimensional code stores the identity information of the customer, etc. When a certain customer needs to enter the closed space 1 from the outside, the two-dimensional code generated by the application software is directly opposite to the scanning end of the scanning device 1021, the scanning device 1021 decodes the two-dimensional code after code scanning, and transmits the decoding result to the data processing equipment 7. If the two-dimensional code is identifiable and the identified identity information matches with the identity information stored in the customer database in advance, it is determined that the customer identity is legal, the access control device 101 is opened to allow the customer to enter the closed space 1. The access control device 101 at the customer entrance 103 is provided with a sensing device, such as an infrared sensor, and when the customer enters the closed space 1, the access control device 101 senses that someone has passed the access control and then automatically closes. When the customer finishes shopping and needs to leave the closed space 1, the access control device 101 at the customer exit 104 senses that someone approaches the access control device 101 from the inside of the closed space 1, the access control device can be automatically opened, and after the customer leaves the closed space 1, the access control device 101 senses that someone passes the access control device and then is automatically closed.

After the identity acquisition unit 1022 acquires the identity information of the customer according to the identity identification code, the data processing equipment 7 may generate a shopping database of the customer, and acquire shopping information to update the shopping database according to each shopping behavior of the customer during the shopping process of the customer. Because the mobile communication terminal carried by the customer carries out real-time data exchange with the data processing equipment 7 through the application software (APP), the shopping database of the customer can also be displayed in the application software (APP) in the mobile communication terminal to form a shopping cart interface, so that the customer can know the shopping record and subsequent settlement.

Figure 4:
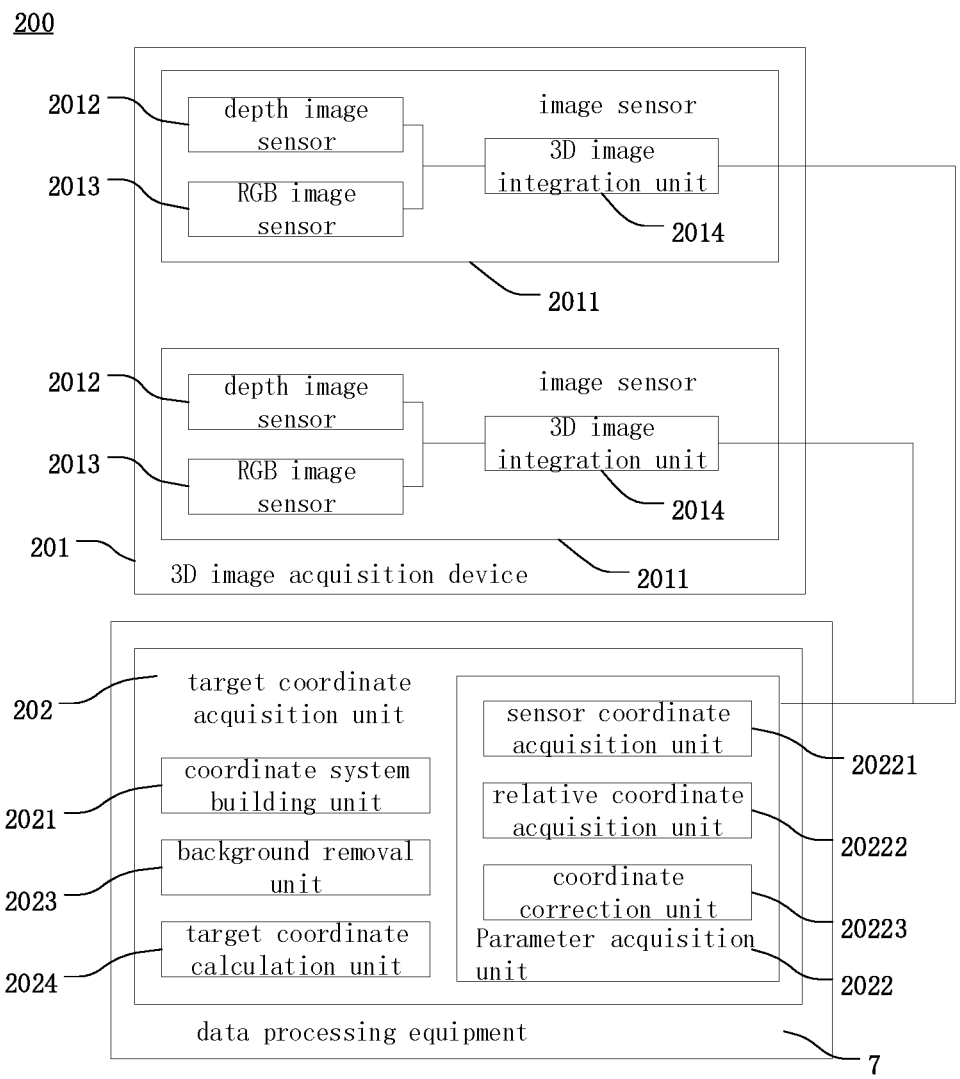
FIG. 4 is a structural block diagram of a customer positioning system according to an example of the disclosure.

Referring to FIG. 4, the example further includes a target positioning system 200, which is used for acquiring a real-time position of each target in the closed space 1, wherein the target is all or part of the customer and its extension portion, and is used for acquiring a coordinate set of the whole or part (such as the head, the hand, etc.) of the customer. The target positioning system 200 includes a 3D image acquisition device 201 connected to the data processing equipment 7 and a target coordinate acquisition unit 202 provided in the data processing equipment 7.

Figure 5:
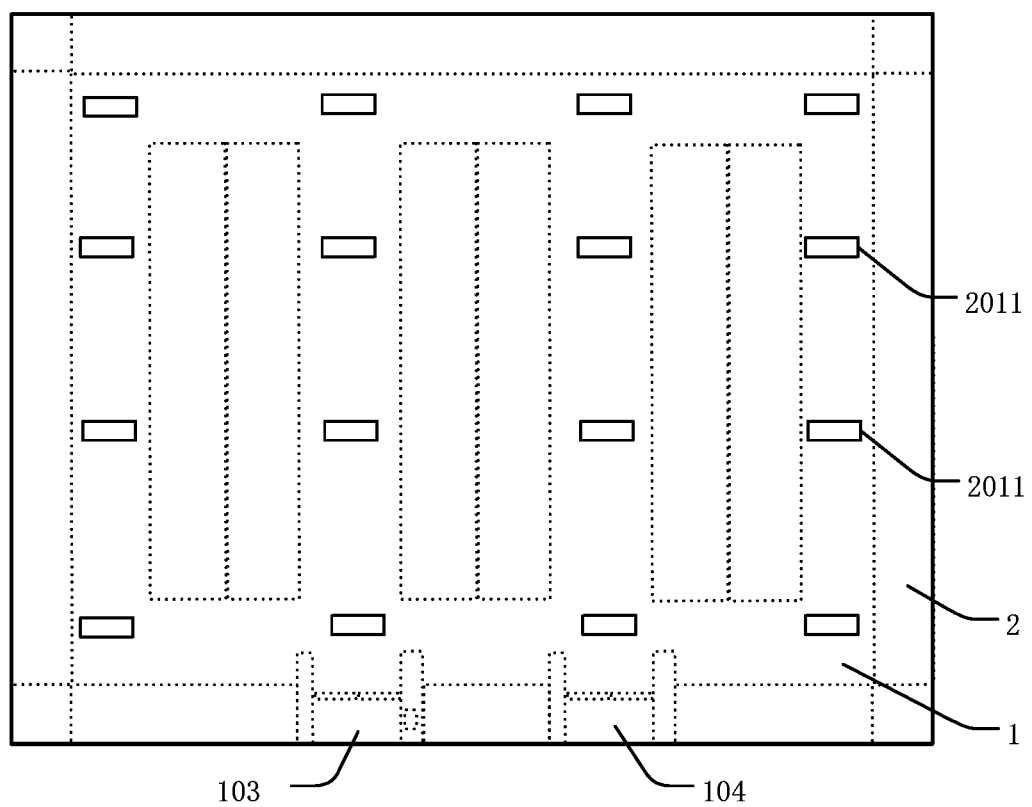
FIG. 5 is a structural diagram illustrating a distribution of an image sensor in an enclosed space according to an example of the disclosure.

Referring to FIG. 5, the 3D image acquisition device 201 includes at least one image sensor 2011 for capturing at least one frame of three-dimensional image in real time. The image sensors 2011 are uniformly distributed on the top of the enclosed space 1, the lenses of the image sensors 2011 face downward, the central axes of the lenses may be perpendicular to the horizontal plane or have a certain inclination angle, and the field of view of the image sensors 2011 covers the entire bottom surface of the enclosed space 1. When a customer moves or shop in an unmanned supermarket, the customer is always under the monitoring of the image sensor, and the three-dimensional image acquired by the image sensor comprises a customer image, wherein the customer image refers to the whole or part of the body and the extension part of the customer. If no one is in the closed space, the three-dimensional image at each moment is the same as that at the previous moment, and the three-dimensional images at the moment can be judged to be the background without any customer images.

Each of the image sensors 2011 includes a depth image sensor 2012 and an RGB image sensor 2013 set in parallel, and a 3D image integration unit 2014, where the depth image sensor 2012 continuously acquires a plurality of frames of depth images, the RGB image sensor 2013 continuously acquires a plurality of frames of RGB images, and the 3D image integration unit 2014 combines a frame of depth image and a frame of RGB image acquired at the same time into a frame of three-dimensional image.

The two sensors acquire synchronously and simultaneously, and the acquisition frequency is the same; the 3D image integration unit 2014 may continuously acquire a plurality of frames of three-dimensional images and transmit the frames of three-dimensional images to the target coordinate acquisition unit 202 of the data processing equipment 7.

The target coordinate acquisition unit 202 is a functional module in the data processing equipment 7, establishes a three-dimensional coordinate system in the closed space, and acquire coordinates or a group of coordinates of the customer in the three-dimensional coordinate system in real time according to the continuous multi-frame three-dimensional images including the customer images. The target coordinate acquisition unit 202 includes a coordinate system building unit 2021, a parameter acquisition unit 2022, a background removal unit 2023, and a target object coordinate calculation unit 2024. The coordinate system building unit 2021 establishes a three-dimensional coordinate system in the closed space, e.g., selects a center point of a bottom surface (unmanned supermarket ground) of the closed space as an origin of the coordinate system, and sets an X axis and a Y axis in a horizontal direction and a Z axis in a vertical direction.

Because the whole or part of the customer body occupies a larger space under the three-dimensional coordinate system, the position of the customer can be represented by a group of coordinates (i.e., coordinates of a number of points). For the position to be accurately controlled and conveniently calculated, the position of the customer can also be represented by the coordinates of a specific point in the group of coordinates, for example, the position of the customer can be represented by the coordinates of the highest point (the point with the largest Z-axis numerical value) in the customer coordinate set.

The parameter acquisition unit 2022 processes the continuous multi-frame three-dimensional images including the customer images to acquire the position parameters and the color parameters of each pixel point of each frame of three-dimensional image; the position parameters are x, y and z, and represent the position coordinates of the pixel point under the three-dimensional coordinate system; the color parameters are r, g and b, and respectively represent the three primary color intensities of the pixel point. When a customer moves into the field of view of any image sensor, the data processing equipment 7 may acquire a plurality of frames of three-dimensional images, each frame of three-dimensional image includes a customer image and a background image, and each pixel may be a part of the customer or a part of the background.

In the three-dimensional (3D) images acquired by different image sensors, pixel points which represent the same positions of the customer body and the extension parts thereof are the same in color parameters r, g and b. Because the distances between the image sensors at different positions and the customer are different, the primary position parameters directly acquired by each image sensor are the position coordinates of a point on the body of the customer and the extension part thereof relative to the image sensor, so coordinate transformation is required to convert the primary position parameters acquired by the image sensors at different positions into the position parameters under the three-dimensional coordinate system established in the closed space.

The parameter acquisition unit 2022 includes a sensor coordinate acquiring unit 20221, a relative coordinate acquiring unit 20222, and a coordinate correcting unit 20223. The sensor coordinate acquiring unit 20221 acquires coordinates of a center point of an image sensor that acquires the frame of three-dimensional image in the 3D coordinate system established in the closed space, wherein the center point of an image sensor is a midpoint of the lens center point connecting line of the depth image sensor 2012 and the RGB image sensor 2013 set in parallel; the relative coordinate acquisition unit 20222 establishes a second 3D coordinate system by using the central point of the image sensor as a second origin, the directions of the X axis, the Y axis and the Z axis of the second 3D coordinate system are the same as the three-dimensional coordinate system, and the coordinates of each pixel point in the second 3D coordinate system are acquired from the 3D image; the coordinate correcting unit 20223 is used for calculating and correcting the coordinates of each pixel of the three-dimensional image in the 3D coordinate system according to the coordinates of the image sensor center point in the 3D coordinate system and the coordinates of each pixel of the three-dimensional image in the second three-dimensional coordinate system, so as to obtain the position parameters of each pixel of the customer and the extension portion.

In M frames of 3D images which are continuously collected, each frame of 3D only comprises an image of a customer, if the color parameters of N pixel points which belong to different 3D images and have the same position parameters are the same, and N is larger than 0.9*M; M is smaller than or equal to M, the background removal unit 2023 judges that the N pixel points are background pixel points, and removes N background pixel points from the M frames of 3D images to obtain M frames of background-free three-dimensional images, that is the image of the customer. In the continuously acquired three-dimensional images, if the color parameters of the pixel points which belong to different three-dimensional images and have the same position parameters are all the same, or most of these color parameters (such as 90%) are the same, the position of the pixel point can be determined as the background, so that the pixel point can be removed from the corresponding 3D image.

In the target coordinate calculation unit 2024, if the target is customer and all the extension portion of the customer, the set of the position parameters of all the pixel points in the M frames of the background-free 3D1 image is the group of coordinates of the customer and all the extension portion; in the group of coordinates, the position parameters of the pixel point with the largest parameter z is determined as the coordinates of the customer. In the continuously acquired 3D background pixel points are removed, the remaining pixel points can represent the whole track of the customer. If each frame of 3D image in the continuously acquired M frames of 3D images comprises images of a plurality of customers, a 3D image which only comprises all or part of one customer needs to be extracted from each M frames of 3D images.

If the target is the customer and a part extension of the customer, a group of coordinates of the part of the customer, such as the head, shoulder, elbow, wrist, hand, etc., may be obtained. The depth image sensor 2012 and the RGB image sensor 2013 are respectively provided with a lens, and if the central axes of the two lenses are set to be perpendicular to the horizontal plane, the two lenses can overlook goods and customers in the closed space. Normally, the two lenses can capture the group of coordinates of the head and the shoulder of the customer, and when the customer stretches out the hand, the group of coordinates of the arm, the elbow, the wrist and the hand of the customer can be captured. If the head, the shoulder, the elbow, the wrist and the hand of the customer at a certain moment are all connected into a fold line or a curve, the corresponding relation between the hand and the head position of the customer can be established, that is, the position of a certain hand can be acquired in real time, and meanwhile, which customer the hand belongs to can be judged.

Further, the field of view of the image sensor 2011 may cover an outside the doorway of the partial space, and when the customer is outside the doorway, the image of the customer may be acquired by the image sensor 2011. All processes of using the unmanned vending system by the customer include an identity identification process at an entrance and an exit, a process of entering the closed space 1, a process of walking or staying in the closed space 1 and a process of leaving the closed space 1, and all the processes are under the monitoring of the image sensor 2011, so that the real-time position of a known certain customer and a part of the body of the customer in the closed space 1 can be monitored in real time. When the scanning device 1021 reads the two-dimensional code of the customer, the data processing equipment 7 can obtain the identity information of the customer, and the image sensor 2011 starts to track the position of the customer in real time from the time when the scanning device 1021 reads the code, so as to monitor whether the customer is matched with a certain shelf. When the image sensor 2011 cannot acquire the real-time 3D image of the customer, it can be identified that the customer ends shopping and then settlement is performed.

Figure 6:
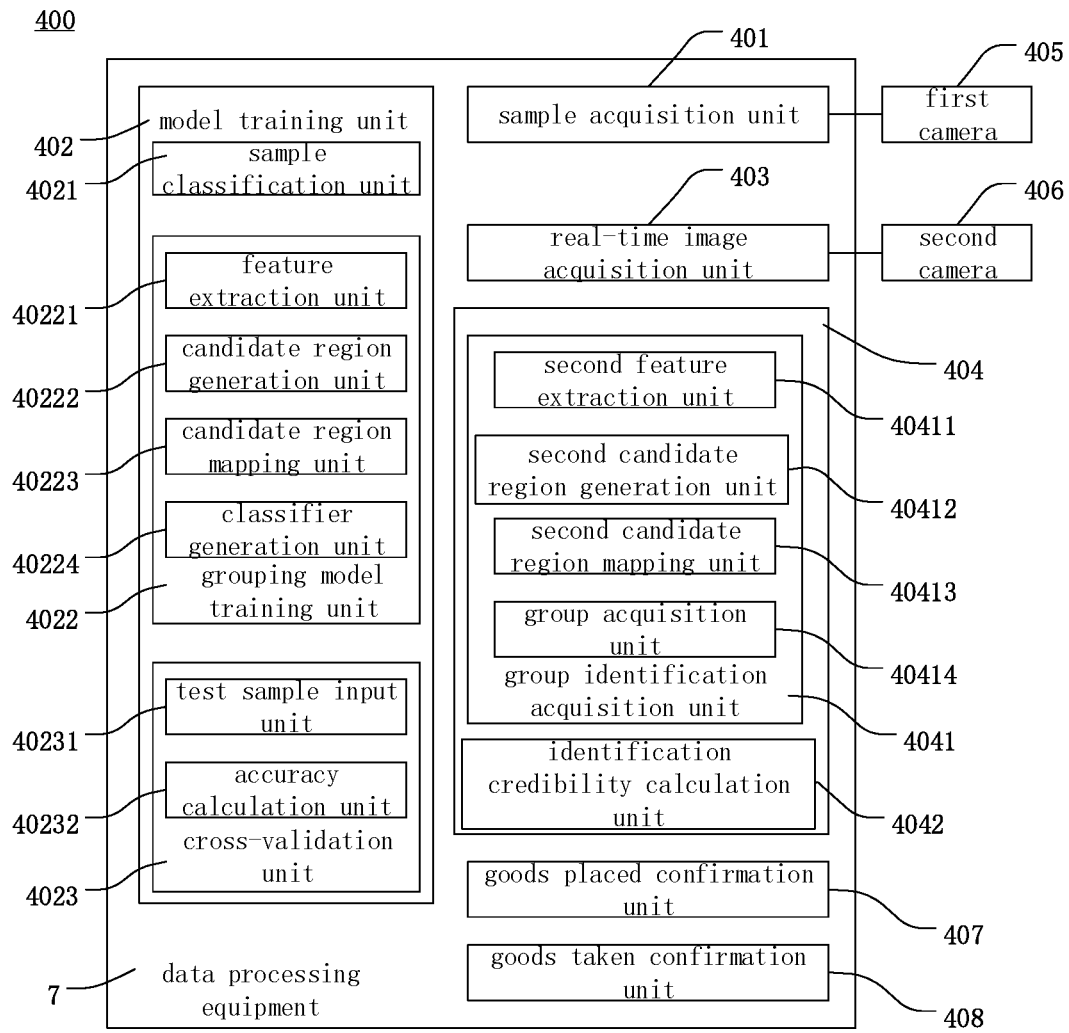
FIG. 6 is a structural block diagram of the goods sensing system based on image monitoring according to an example of the disclosure.

Referring to FIG. 6, the example of the disclosure relates to a good sensing system based on image monitoring 400, which includes a sample collection unit or a sample collector 401, a model training unit or a model trainer 402, a real-time image acquisition unit or a real-time image collector 403, and a goods category acquisition unit or a goods category deriver 404, wherein the four units may be function modules in the data processing equipment 7, and the good sensing system based on image monitoring 400 can monitor the real-time image of the space in front of the shelf, and determine the type of the good to be taken away or replaced. As shown in FIG. 6, the "sample acquisition unit 401" may also be referred to as the "sample collection unit" or "sample collector." These terms may be used interchangeably throughout this disclosure, and may be implemented as a hardware device, a software module, or a combination of hardware and software, that collects and/or stores sample images. Similarly, the terms "model training unit" and "model trainer," "real-time image acquisition unit" and "real-time image collector," "goods category acquisition unit" and "goods category deriver," respectively, may also be used interchangeably throughout this disclosure.

The good sensing system based on image monitoring 400 further includes a first camera 405 and a second camera 406, wherein the first camera 405 is connected to the sample collection unit 401 in the data processing equipment 7, and is used for taking images of each goods at multiple angles and/or multiple distances. The second camera 406 is connected to the real-time image collecting unit 403 in the data processing equipment 7 for taking a real-time image of the space in front of a shelf.

Figure 7:
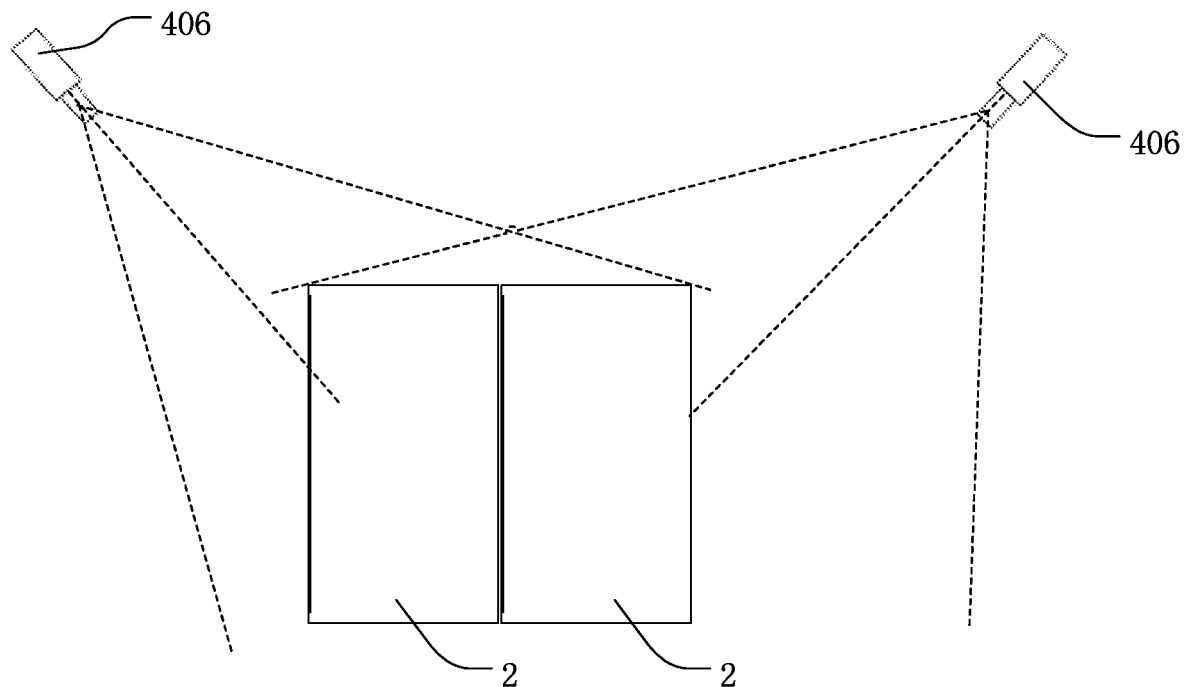
FIG. 7 is a diagram illustrating a relationship between a second camera and a shelf according to an example of the disclosure.

Referring to FIG. 7, the number of the second cameras 406 is two or four, and the second cameras 406 are set outside the shelf 2, and each of the second cameras 406 faces one corner of the shelf 2. The front ends of the plurality of rack 5 of the shelf 2 are located on the same plane, the plane is called a shelf plane, the second camera 406 is provided with a lens, and the field of view of the lens covers the space in front of the shelf; when the goods are taken down from the shelf or placed on the shelf, the images of the taking down process or the putting back process of the goods are shot by the second camera. The space in front of the shelf is a space area corresponding to the plane of the shelf in front of the shelf, the space in front of the shelf generally refers to an area of a range 30-50 cm wide in front of the shelf, and the lens of each second camera 406 faces the central area of the space in front of the shelf.

In an example, the angle between the central axis of the lens of the second camera 406 and the horizontal plane is 30-60 degrees; and/or the distance between the lens of the second camera 406 and the upper or lower end of the shelf 2 is 0.8-1.2 meter; and/or the distance between the lens of the second camera 406 and one side edge of the shelf 2 is 0.8-1.2 m, so that the field of view of the second camera 406 can completely cover the space in front of the shelf, and when the goods are removed from the shelf 2 or placed on the shelf 2, the image of the removing process or the placing process is shot by the second camera 406.

Referring to FIG. 6, the sample acquiring unit 401 is configured to acquire at least one set of image samples, where each set of image samples including a plurality of sample images of a good at multiple angles; and a set of image samples of the same type of goods is provided with the same group identification, and the group identification represents the type of the goods corresponding to the set of image samples. In an example, the first camera 405 needs to take 3000 to 5000 images at different angles and different distances for each type of goods on the shelf 2, and transmits the images to the sample collection unit 401 of the data processing equipment 7. Some of the images are images for independently shooting goods, some are images for goods with backgrounds, some are images for goods held in hands by someone, and some are images for stacking a plurality of similar products together. Because the goods sold in the unmanned supermarket related to the example are standard goods, and the six-surface views of the goods of the same type are the same or similar, the sampling of the training samples of the goods of the same type can be completed only by selecting one or more products from the goods of the same type and photographing the products for multiple times.

The model training unit 402 is used for training a Convolutional Neural Network (CNN) model according to each sample image in the multiple sets of image samples and the group identifier of each sample image, and obtaining a goods identification model. A Convolutional Neural Network (CNN) is a feedforward Neural Network, and has excellent performance for large-scale image processing. The convolutional neural network model in this example is a faster RCNN based network model with the smallest computation amount and the fastest response speed, and the fastest response speed of the model is only about 0.2 seconds, so that the type and the number of the goods of the image can be accurately identified in a very short time. If the number of samples for training the model is small or the sharpness of the samples is low, the models obtained by training only once may have a large error in judging the types of goods displayed in the images, so that a cross-validation process is available, and more accurate models can be obtained. The model training unit 402 includes a sample classification unit or a sample classifier 4021, a grouping model training unit or a grouping model trainer 4022, and a cross-validation unit or a cross-validator 4023.

The sample classification unit 4021 randomly divides the multiple sets of image samples into two categories: training samples and test samples; a grouping model training unit 4022 inputs each sample image of multiple sets of training samples and a group identification thereof to a convolutional neural network model, and obtains a grouping model after training; the cross-validation unit 4023 is used for validating the grouping model according to each image of the multiple sets of test samples and the group identification of each set of the test samples, and calculating an accuracy of the grouping model; when the accuracy rate of the grouping model is smaller than a preset threshold value (such as 90%), the sample classification unit re-groups and retrains the samples; and when the accuracy rate of the grouping model is greater than or equal to the preset threshold value (such as 90%), the grouping model is the goods identification model. If the number of samples of the model training is small or the definition of the samples is low, the grouping models obtained by training only once may have a large error in judging the type of the goods displayed in the image, and therefore it may be provided with a cross-validation unit 4023.

If the training samples of the model are enough and the sharpness of the samples is higher, the model can be directly trained once, a grouping model can be trained by using the neural network model, and the grouping model can effectively judge the types of goods displayed in the images. In other examples, the model training unit 402 may only include the grouping model training unit 4022, all or part of the multiple sets of image samples acquired by the sample collection unit 401 are used as training samples, each sample image and its group identification are input to the convolutional neural network model, and a grouping model, which is a goods identification model, is obtained after training.

The grouping model training unit 4022 includes a feature extraction unit or a feature extractor 40221, a candidate region generation unit or a region proposal generator 40222, a candidate region mapping unit or a region proposal mapper 40223, and a classifier generation unit or a classifier generator 40224. The feature extraction unit 40221 inputs the image of each training sample into the convolutional neural network, performs feature extraction, and obtains a feature map corresponding to a region in the training image where all or part of the goods are displayed; the candidate region generation unit or region proposal generator 40222 inputs the image of each training sample into a candidate region network or region proposal network (RPN), and generates a plurality of region candidates or region proposals; the candidate region mapping unit or the region proposal mapper 40223 maps the image candidate region (or region proposal) of each training sample to the feature map of the last layer of convolution layer of the convolutional neural network; the classifier generation unit 40224 collects the image feature map and the candidate regions (the region proposals) of the plurality of training samples, calculates feature map of the candidate regions or proposal feature maps, and sends proposal feature maps to a classifier network to generate a classifier. In the classifier network, the feature maps of all training sample images corresponding to the same goods form a corresponding relation with the group identification of the goods, and the group identification is the type of the goods corresponding to the group of image samples.

The cross-validation unit 4023 includes a test sample input unit or a test sample inputter 40231 and an accuracy calculation unit or an accuracy calculator 40232, and the test sample input unit 40231 inputs each image of a plurality of test samples to the grouping model to obtain test group identification of the plurality of test samples; the accuracy calculation unit 40232 compares the test group identification of the plurality of test samples with the group identification of the test samples, and calculates a ratio of the number of the same identifications (a same identification means that the test group identification of a test sample matches the group identification of the test sample) to the number of the test samples, wherein the ratio is the accuracy of the primary data model (i.e. the grouping model). In an example, the preset threshold is set to 90%, and when the accuracy of the grouping model is less than 90%, the sample classification unit 4021 re-groups and retrains the samples; when the accuracy of the grouping model is greater than or equal to 90%, the grouping model is used as the goods identification model.

The real-time image collecting unit 403 is configured to continuously collect at least one real-time image of the space in front of the shelf, where each real-time image includes part or all of one or more goods images. The real-time image collecting unit 403 is connected to the plurality of second cameras 406, is set at the edge of the shelf, and captures images of an area in front of the shelf in real time. When the customer takes the goods from a shelf or when the customer places the goods on a shelf, the second camera 406 may take an image of the goods in front of the shelf, the image including a photograph of all or part of the goods, and display the shape, pattern and color of the goods. The second camera acquires a plurality of real-time images of the goods and transmits the images to the real-time image acquisition unit 403.

In consecutively acquired multi-frame pictures, the distances between the goods and the edge of the shelf in each image are different, the data processing equipment 7 can calculate the change of the distances to judge the change of the distances between the goods and the shelf. If the distances are larger, the goods can be considered to be taken away from the shelf, and if the distances are smaller, the goods can be considered to be placed on the shelf.

Assuming that the customer holds the article (i.e., goods) in front of the shelf for 1 second, the second camera 406 obtains 60 real-time images of different angles within 1 second, and the display of each image may include the hand of the customer and a part of the good. If the real-time images do not contain any goods, for example, some goods are of small size, only the hand of the customer can be displayed in some images, or only the background image is displayed in some images, such images can be screened out. The example cannot be applied to goods of an extremely small size, and if the goods are completely wrapped by the customer's hand, the type of the goods cannot be identified.

The second camera 406 can be a device which continuously operates for a long time, or an infrared switch is set on the rack and connected to the second camera 406, and the second camera 406 is in a power-off state at ordinary times; when the customer leaves, the infrared switch senses no heat and turns off, and the second camera 406 is powered off and turned off.

The goods type acquisition unit 404 is configured to obtain the type and the number of the goods displayed in the real-time image according to the real-time image and the goods identification model. The goods type acquisition unit 404 includes a group identification acquisition unit or a group identification collector 4041 and an identification credibility calculation unit or an identification credibility calculator 4042.

The group identification acquisition unit 4041 obtains a plurality of real-time images including a certain goods, inputs the images into the good identification model, and obtains a plurality of group identifications corresponding to the plurality of real-time images output by the model as a possibility conclusion. The group identification acquisition unit 4041 includes a second feature extraction unit or a second feature extractor 40411, a second candidate region generation unit or a second region proposal generator 40412, a second candidate region mapping unit or a second region proposal mapper 40413, and a group acquisition unit or a group collector 40414. The second feature extraction unit 40411 inputs a real-time image into the convolutional neural network, and performs feature extraction to obtain a feature map; a second candidate region generation unit 40412 inputs the real-time image into a candidate region network (or a region proposal network), and generates a plurality of candidate regions (or region proposals); a second candidate region mapping unit 40413 maps the candidate region of the real-time image to a feature map of the last layer of the convolutional neural network; the group acquisition unit 40414 collects the feature maps and the candidate regions of the plurality of images, calculates the feature maps of the candidate regions, and sends the feature maps to the classifier network to obtain the group identification corresponding to the real-time image. After each real-time image is input into the goods identification model, the group identification corresponding to the image can be judged, and if the second camera acquire 60 images, and a certain goods is displayed on each image, the 60 group identifications can be acquired by inputting the goods into the goods identification model.

The identification credibility calculating unit 4042 calculates a ratio of the number of each group identification in the possibility conclusion or the likelihood conclusion to the total number of all group identifications in the likelihood conclusion, where the ratio is the credibility of each group identification, and the type and/or the number of the goods corresponding to the group identification with the highest reliability is the type and/or the number of the goods displayed on the real-time image. Comparing the 60 group identifications, if the number of times of appearance of the product A is 36, the number of times of appearance of the product B is 18, and the number of times of appearance of the product C is 6 in the 60 product categories corresponding to the 60 group identifications, the three types of reliability are 60%, 30%, and 10%, respectively, and the category of the product displayed on the real-time image can be determined to be the product A with the highest reliability. The goods type acquisition unit 404 may further determine the number of goods if the image sample acquired by the sample collection unit 401 includes a plurality of images in which goods of the same type are stacked together.

The image monitoring-based goods sensing system 400 has the advantages that the image of the space in front of the shelf can be monitored in real time, whether the goods are taken from the shelf or put back to the shelf is judged, the probability conclusion of the type and the quantity of the goods is deduced by using the convolution algorithm in machine learning, and the result with the highest reliability is selected as the final conclusion.

Figure 8:
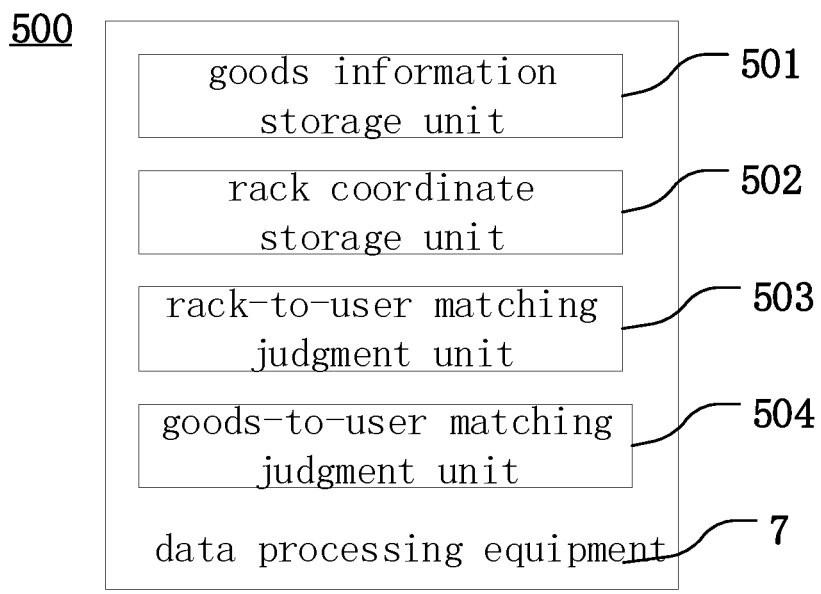
FIG. 8 is a structural block diagram of a shopping customer judgment system according to an example of the disclosure.

Referring to FIG. 8, the example further includes a shopping customer judgment system 500, which is a functional module in the data processing equipment 7, and obtains the customer identity of the good taken or put back according to the identity information of the customer and the real-time location of the customer when the good of any type is taken or put back. The shopping customer judgment system 500 includes a good information storage unit 501, a rack coordinate storage unit 502, a rack-to-customer matching judgment unit 503, and a goods-to-customer matching judgment unit 504.

The data processing equipment 7 is provided with a goods database, and the goods database is stored in the goods information storage unit 501, and comprises goods information of each goods; the goods information comprises the goods name, the model, the net content, the unit price of the each good, and further comprises the shelf number for placing the goods, the rack number for placing the goods and the goods serial number.

The target positioning system 200 establishes a three-dimensional coordinate system in the closed space, and since the positions of the shelves 2 and the rack 5 are determined, the coordinates of each shelf 2 and each rack 5 can be obtained after the coordinate system is established, the group of shelf coordinates and the group of rack coordinates are stored in the rack coordinate storage unit 502, and the height (for example, 30 CM) of the rack space above the rack for placing the goods is set, so that the group coordinates of the rack space can be obtained.

The target coordinate acquisition unit 202 may obtain a real-time group of coordinates of the hand of each customer with known identity, and when the group of coordinates of the shelf space above a rack intersects with the group of coordinates of the hand of a customer, the rack and customer matching determining unit 503 determines that the rack matches the customer, and the customer may be considered to stretch the hand into the shelf space above the rack.

The target positioning system 200 establishes a 3D coordinate system in the closed space, and since the positions of the shelves 2 and the rack 5 are determined, the coordinates of each shelf 2 and each rack 5 can be obtained after the coordinate system is established, the group of shelf coordinates and the group of rack coordinates are stored in the rack coordinate storage unit 502, and the height (for example, 30 CM) of the rack space above the rack for placing the goods is set, so that the group of coordinates of the rack space can be obtained.

The target coordinate acquisition unit 202 may obtain a real-time group of coordinates of the hand of each known customer, and when the group of coordinates of the shelf space above a rack intersects with the group of coordinates of the hand of a customer, the rack-to-customer matching judgment unit 503 determines that the rack matches the customer, and the customer may be considered to stretch the hand into the shelf space above the rack.

The goods sensing system based on image monitoring 400 monitors the real-time image of the space in front of the shelf through the second camera 406, and can determine the picking and placing states of the goods according to the distance change between the goods and the shelf in the multiple frames of images continuously acquired, and determine the type and quantity of the taken or placed goods. The taking and placing states comprise a goods standing state, a taken-away state and a placed-back state.

When goods is removed from or placed on a shelf and a customer matches the shelf at the same time, the goods-to-customer matching judgment unit 504 judges that the good matches the customer, and the good is removed from or placed on the shelf by the customer at this time, thereby determining the identity of the customer who removed or placed back the good.

Figure 9:
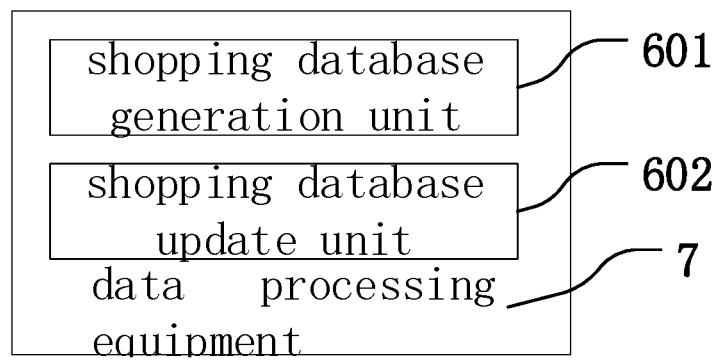
FIG. 9 is a structural block diagram of a shopping database system according to an example of the disclosure.

Referring to FIG. 9, the example further includes a shopping information recording unit 600, which is a functional module in the data processing equipment 7, for generating at least one shopping database according to the identity information of each customer, so as to record the category and quantity of at least one good taken by each customer. The shopping information recording unit 600 includes a shopping database generation unit 601 and a shopping database update unit 602.

When the identity of a customer is recognized by the customer identification system 100, the identity acquisition unit 1022 acquires the identity information of the customer, and the shopping database generation unit 601 generates the shopping database of the customer in the data processing equipment 7 according to the identity information of the customer, and the shopping database in the initial state has no shopping information.

The shopping database updating unit 602 generates a set of shopping information including the type and amount of the good removed at the moment and the good information of the good, such as the name, model, net content, unit price, etc., according to the type and amount of the good removed and the identity information of the customer who removes the good, and stores the set of shopping information in the shopping database of the customer. After the customer takes away goods in the enclosed space 1 for many times, a multiple sets shopping information are included in the shopping database, and the mobile communication terminal carried by the customer is connected with the data processing equipment 7 in a wireless communication mode and carries out data exchange, so that the shopping information in the shopping database can also be displayed on an APP interface of the mobile communication terminal of the customer to form an electronic shopping cart of the customer.

When the goods are matched with a customer, if the goods sensing system based on the image monitoring 400 monitors that a certain goods is placed on the rack, the type and the quantity of the goods can be judged. The data processing equipment 7 searches the shopping database of the customer for each shopping information to determine whether the category of the purchased goods matches the category of the goods, whether one or more purchased goods in the shopping database of the customer are the same as the goods placed on the shelf.

If the image-based monitoring system 400 determines that the type of the returned goods is inconsistent with the type of the original goods on the rack, an alarm signal can be selectively generated to remind the manager or the customer of the misplacement. If the good sensing system based on image monitoring 400 cannot determine the type of the returned good, it can be determined that the good returned to the rack is not the existing good in the unmanned supermarket, and may be the goods or personal belongs carried by the customer, such as an umbrella, a mobile phone, etc., and at this time, an alarm signal is optionally generated, and if necessary, the rack number of the rack can be displayed on a display so as to remind the manager or the customer.

In other examples, the unmanned vending system may further include a goods sensing system based on weight-monitoring. Only one type of goods is placed on each rack, a weight sensor is set in each rack, and the weight change of each rack is sensed in real time.

Figure 10:
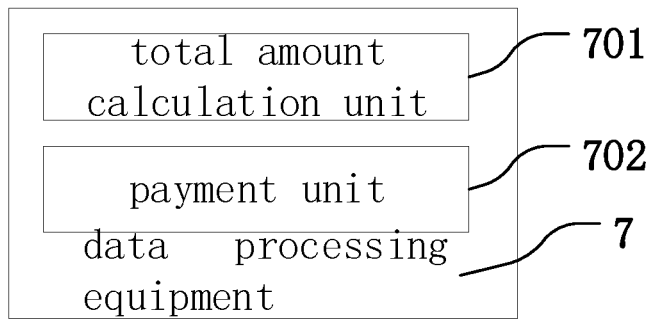
FIG. 10 is a structural block diagram of a settlement system according to an example of the disclosure.

Referring to FIG. 10, the example further includes a settlement system 700, which is a functional module in the data processing equipment 7, for settling a fee according to the types and amounts of all goods in the shopping database of the customer. After the shopping process of the customer is finished, the customer can leave the closed space 1 from the entrance guard device of the entrance. When the image sensor 2011 of the target positioning system 200 cannot acquire the real-time three-dimensional image of the customer, it can be determined that the customer has finished shopping, and the settlement system 700 settles the fee for the customer.

The settlement system 700 includes a total amount calculation unit 701 and a payment unit 702. When the customer leaves the closed space, the total amount calculation unit 701 calculates the total amount according to the types and the amounts of all the goods in the shopping database of the customer, and since the unit price of each type of good is pre-stored in the data processing equipment 7 as goods information, the sum of the products of the unit prices and the corresponding quantities of various goods is the total amount that the customer needs to pay. Further, in other examples, the customer may enjoy discounts on goods or use coupons, etc. for which the total amount the customer needs to pay is the sum of the products of the various unit prices and quantities of the goods minus the coupon and/or coupon amount and/or the discount amount. The payment unit 702 is payment software or third party payment software provided by the settlement system 700, and can deduct money from the bank account or the electronic account of the customer, and the deducted money amount is the same as the total amount that the customer needs to pay.

Figure 11:
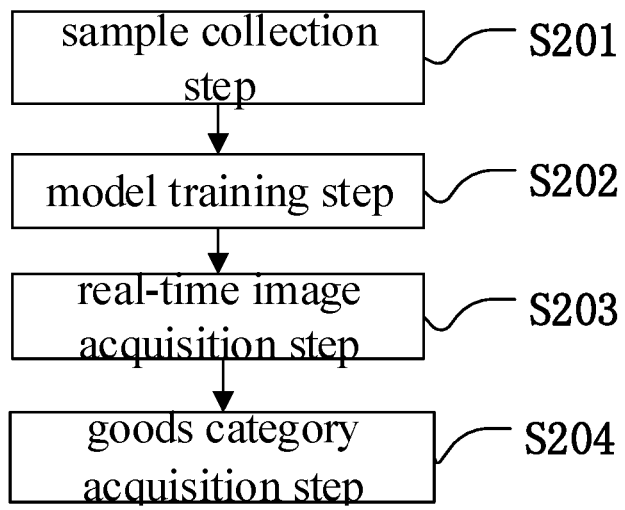
FIG. 11 is a flowchart of a goods sensing method based on image monitoring according to an example of the disclosure.

Referring to FIG. 11, the present disclosure further provides a method for goods sensing based on image monitoring, that is, a method for implementing the system for goods sensing based on image monitoring 400, including the following steps: step S201) a sample collection step, step S202) a model training step, step S203) a real-time image collection step and step S204) a goods category acquisition step. Because the goods sold in the unmanned supermarket related to the example are standard goods, and the six-surface images of the appearances of the goods of the same type are the same, therefore, as long as one or several products are selected in the same type of goods, multiple samples can be taken to complete the sampling of the training samples of the goods.

Step S201) The sample collection step is used for collecting a plurality of sets of image samples, wherein each set of image samples comprises a plurality of sample images of a goods under multiple angles; and a set of image samples corresponding to the goods of the same type is provided with the same group identification, and the group identification is the type of the goods corresponding to the set of image samples. In the sample collection step, images of each goods with multiple angles and multiple distances are shot, for example, the shooting times are 3000-5000 times, if the shooting times are too many, the cost is too high, and if the shooting times are too few, the model error is larger. Each type of goods takes 5000 images with different angles and different distances, some images are taken independently, some images are taken with backgrounds, some images are taken by someone, and even images are obtained after a plurality of goods of the same type are stacked together.

Step S202) The model training step is used for training the convolutional neural network model according to each sample image in the plurality of sets of image samples and the group identification thereof, and obtaining the goods identification model.

Figure 12:
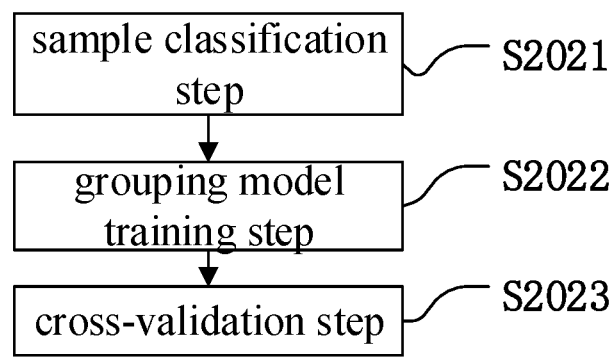
FIG. 12 is a flowchart of a model training step according to an example of the disclosure.

If the number of samples of the model training is small or the definition of the samples is low, the models obtained by training only once may have a large error in judging the type of the goods displayed in the image, and therefore it may have a cross-validation step. Referring to FIG. 12, the model training step S202) includes a sample classification step S2021), a sample classification step S2022), and the cross-validation step S2023).

Step S2021) The sample classification step is used for randomly dividing the plurality of sets of image samples into training sample and test sample; in the step S201), 4000 images with different angles and different distances are taken for each article. The 4000 images corresponding to goods are randomly divided into training samples and testing samples respectively.

Figure 13:
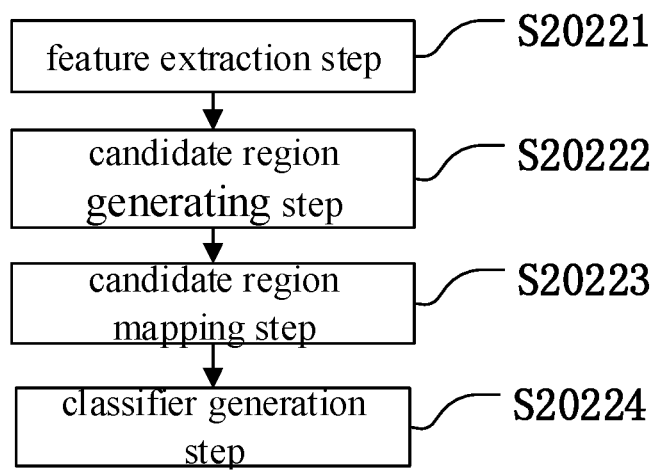
FIG. 13 is a flowchart of a grouping model training step according to an example of the disclosure.

Step S2022) The grouping model training step is used for inputting each sample image of the plurality of sets of training samples and the group identification of each sample image into the convolutional neural network model, and the grouping model is obtained after training. Referring to FIG. 13, the step S2022) includes a feature extraction step S20221), a candidate region generating step S20222), a candidate region mapping step S20223), a classifier generation step S20224). Step S20221) the feature extraction step, in which the image of each training sample is input into a Convolutional Neural Network (CNN) for feature extraction to obtain a feature map corresponding to a region in the training image where all or part of the goods are displayed. For example, 3000 images of a goods find a feature map on each image that is related to the goods in whole or in part. For a color image, the three primary colors of RGB of each pixel point respectively correspond to a two-dimensional matrix, and each matrix generates three new two-dimensional matrices, namely feature maps, after convolution operation is performed on convolution kernels of 3*3 or 5*5. Step S20222) the candidate region generating step is used for inputting the image of each training sample into a candidate region network or a region proposal network (RPN) to generate a plurality of candidate regions, preferably 300 candidate regions per image. A candidate region network is a proposal generation network in the Faster RCNN based model, and since target dimensions of target detection may vary greatly, it is necessary to generate candidate regions of different sizes as much as possible. Step S20223) the candidate region mapping step, is used for converting the candidate regions with different sizes into images with the same size, and mapping the region candidates of the images of each training sample onto a feature map of the last layer of the convolution layer of the convolutional neural network. Step S20224) the classifier generating step is used for collecting the feature maps and the region candidates of the plurality of training samples, calculating the feature maps of the region candidates, and sending the feature maps to a classifier network to generate a classifier. In the classifier network, the characteristic images of all training sample images corresponding to the same goods form a corresponding relation with the group identification of the goods, and the group identification is the type of the goods corresponding to the group of image samples.

Figure 14:
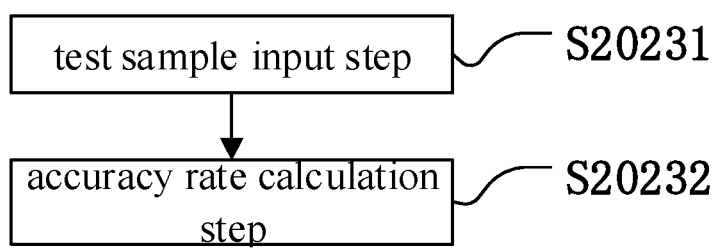
FIG. 14 is a flowchart of the cross-validation step according to an example of the disclosure.

Step S2023) the cross-validation step, which is used for validating the grouping models according to each image of a plurality of sets of test samples and the group identification of each set of test samples, and calculating the model accuracy. Referring to FIG. 14, the cross-validation step includes step S20231) a test sample input step and step S20232) an accuracy calculation step. And step S20231) a test sample input step, which is used for inputting each image of a plurality of test samples into the grouping model and acquiring the test group identification of the plurality of test samples. And step S20232) an accuracy calculation step, which is used for comparing the test group identification of the plurality of test samples with the group identification of the test samples, and calculating the ratio of the number of the same identifications to the number of the test samples, wherein the ratio is the accuracy of the primary data model. When the accuracy of the grouping model is smaller than a preset threshold value, returning to the sample classification step; and when the accuracy rate of the grouping model is greater than or equal to the preset threshold value, the grouping model is considered a goods identification model. In an example, a preset threshold value is set to be 90%, when the accuracy rate of the grouping model is smaller than 90%, the sample classification step is returned, and the samples are regrouped and retrained; when the accuracy of the grouping model is greater than or equal to 90%, the grouping model can be regarded as a goods identification model.

If the training samples of the model are enough and the sharpness of the samples is higher, the model can be directly trained once, a grouping model can be trained by using the faster RCNN based network model, and the grouping model can effectively judge the types of goods displayed in the images. Step S202) the model training step comprises step S2022) a grouping model training step, wherein all or part of the sets of image samples collected in the sample collection step S201) are used as training samples, each training image and the group identification thereof are input into the convolutional neural network model, and the grouping model is obtained after training, and the grouping model is the goods identification model.

Step S203) the real-time image collection step, for continuously collecting at least one real-time image, each real-time image including a part or all of a goods image. And step S203) the real-time image acquisition step comprises a second image acquisition step, wherein a plurality of images of each good are shot, and the shooting times are 10-200 times. The four corners of the shelf are respectively provided with a second camera 206, the visual field of each second camera 206 covers the space area in front of the shelf, and the lens of each second camera 206 faces the central area of the shelf plane. When the customer stretches his/her hands to remove goods from the shelf or place goods on the shelf, the four second cameras 206 take images of the whole or part of the goods from different angles. Assuming that the customer holds the goods and stays in front of the shelf for 1 second, the four second cameras 206 can acquire 120 real-time images at different angles within 1 second, and the display content of each image can include the hand of the customer and the part of the goods. The second camera 206 can be powered on or started for a long time, or an infrared switch can be arranged on the rack and connected to the second camera 206, and the second camera 206 is powered off at ordinary times; and when a customer approaches, the infrared switch senses heat and is turned on, and the second camera 206 is powered on. When the customer leaves, the infrared switch does not sense heat and is turned off, and the second camera 206 is powered off and turned off.

Figure 15:
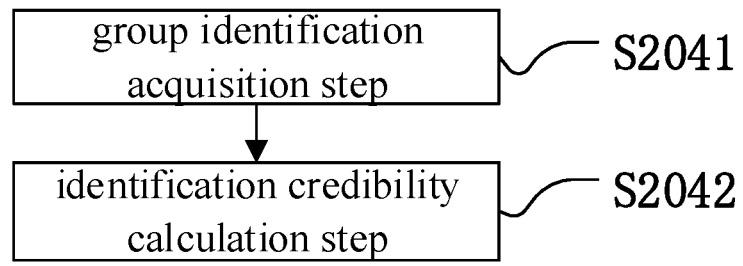
FIG. 15 is a flowchart of the goods category acquisition step according to an example of the disclosure.

And step S204) the goods category acquisition step, which is used for judging the type of the goods displayed in the real-time image according to the real-time image and the goods identification model. Referring to FIG. 15, the step S204) further includes S2041) a group identification acquisition step and S2042) an identification credibility calculation step. The group identification acquisition step S2041), which is used for inputting a plurality of real-time images into the goods identification model and obtaining a plurality of group identifications corresponding to the plurality of real-time images; and step S2042) the identification credibility calculating step, namely calculating the ratio of the number of each group identification to the total number of all the group identifications, wherein the ratio is the credibility of each group identification, and the type of the goods corresponding to the group identification with the maximum credibility is the type of the goods displayed on the real-time image. And (S204) after the execution is finished, returning to the step (S203) for acquiring the real-time images, and shooting the images of the goods in time when the goods are taken away or returned next time.

Figure 16:
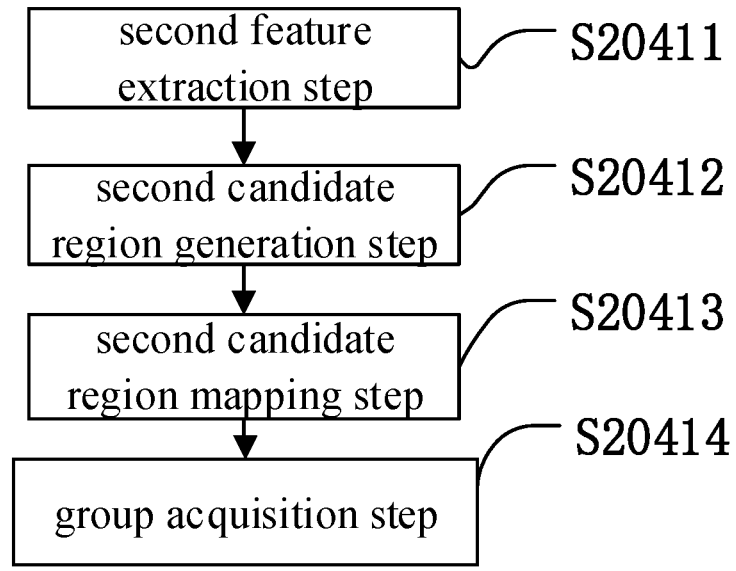
FIG. 16 is a flowchart of the group identification acquisition step according to an example of the disclosure.

Referring to FIG. 16, step S2041) the group identification acquisition step includes: step S20411) a second feature extraction step, step S20412) a second candidate region generation step, step S20413) a second candidate region mapping step, and step S20414) a group acquisition step. Step S20411) the second feature extraction step is used for inputting a real-time image into a Convolutional Neural Network (CNN) for feature extraction to obtain a feature map. Step S20412) the second candidate region generating step is to input the real-time images into a candidate region network (RPN), generate a plurality of region candidates, and generate 300 candidate regions for each live image. Step S20413) the second candidate region mapping step is to map the region candidates of the real-time image onto a feature map of the last layer of the convolutional neural network. Step S20414) the group acquisition step is to collect feature maps and region candidates of the plurality of images, calculate feature maps of the region candidates, send the feature maps to a classifier network, and obtain a group identification corresponding to the real-time image.

Step S2042) the identification credibility calculating step, which is used for calculating the ratio of the number of each group identification in the possibility conclusion to the total number of all group identifications in the possibility conclusion, wherein the ratio is the credibility of each group identification, and the type and/or the number of the goods corresponding to the group identification with the maximum reliability are the type and/or the number of the goods displayed on the real-time image. Comparing the 60 group identifications, if the number of appearance of the product A is 36 times, the number of appearance of the product B is 18 times, and the number of appearance of the product C is 6 times in the 60 goods categories corresponding to the 60 group identifications, the three types of credibility are 60%, 30%, and 10%, respectively, and the category of the goods displayed on the real-time image can be determined to be the goods A with the highest credibility. If the image sample collected in step of step S201) includes a plurality of photos of the same type stacked together, step S204 the goods type acquisition step) may further determine the number of the goods.

The goods sensing system and the goods sensing method based on the image monitoring can judge the taking and placing states of goods on the goods outlet shelf and the specific types of the taken or placed goods according to the real-time images of the space in front of the shelf, can accurately judge the quantity of the goods by combining the goods sensing system based on the weight monitoring, and can accurately judge the customer identification of the taken or placed goods by combining the customer identification technology and the customer tracking technology, so that shopping records are accurately added or deleted in the customer shopping database, and automatic settlement is facilitated after the shopping of a customer is finished.

With the goods sensing system and the goods sensing method based on the image monitoring according to the examples of the disclosure, the problems of poor sensing accuracy of goods taking and placing states, too much deviation, high cost and easy loss of goods may be alleviated. The goods sensing system and the method for goods sensing based on image monitoring according to the examples of the disclosure can judge the taking and placing states of goods on the shelf, and judge the specific types of the taken or placed goods according to real-time images of the space in front of the shelf. If the goods sensing system based on weight monitoring is combined with the goods sensing system of the examples of the disclosure, the quantity of goods can be accurately calculated; and if the customer identity recognition technology and the customer tracking technology are combined, the identity of the customer that takes or returns the goods can be accurately determined, so that a shopping record is accurately added or deleted in the customer shopping database, and automatic settlement can be conveniently carried out after finishing shopping.

The description of the present disclosure has been presented for purposes of illustration, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A goods sensing system based on image monitoring, comprising:
    a sample collector that collects a plurality of sets of image samples, wherein each set of the image samples comprise a plurality of sample images of a type of goods at multiple angles, wherein a set of the image samples of a same type of goods are provided with a same group identification, and the group identification is the type of the goods corresponding to the set of image samples;
    a model trainer that trains a convolutional neural network model according to each sample image in the plurality of sets of the image samples and a group identification of the sample image to obtain a goods identification model;
    a real-time image collector that continuously acquires at least one real-time image of space in front of a shelf, wherein each real-time image comprises part or all of images of goods; and
    a goods category deriver that obtains a type and quantity of the goods displayed in the real-time image according to the real-time image and the goods identification model, wherein the goods category deriver further comprises:
    a group identification collector that inputs a plurality of real-time images into the goods identification model and acquires a plurality of group identifications corresponding to the plurality of real-time images as a possibility conclusion; and
    an identification credibility calculator that calculates a ratio of the number of each group identification in the possibility conclusion to the total number of all group identifications in the possibility conclusion, wherein the ratio is a credibility of each group identification, and a type and/or quantity of the goods corresponding to a group identification with a maximum credibility is the type and/or the quantity of the goods displayed in the real-time images.

2. The goods sensing system based on image monitoring according to claim 1, further comprising:
    a first camera connected to the sample collector and configured to shoot images of each goods at multiple angles and/or multiple distances; and
    a second camera connected to the real-time image collector and configured to shoot the real-time image of the space in front of the shelf;
    wherein the second camera is provided with a lens, and a field of view of the lens covers the space in front of the shelf.

3. The goods sensing system based on image monitoring according to claim 2, wherein the number of the second cameras is two or four; or
    the lens of the second camera faces a middle portion of the space in front of the shelf; or
    the angle between a central axis of the lens of the second camera and a plane parallel to the shelf is 30-60 degrees; or
    a distance between the lens of the second camera and an upper end or a lower end of the shelf is 0.8-1.2 meters; or
    a distance between the lens of the second camera and one side of the shelf is 0.8-1.2 meters.

4. The goods sensing system based on image monitoring according to claim 1, wherein the model trainer comprises:
    a grouping model trainer that inputs each sample image of a plurality of sets of training samples and a group identification of each set of the training samples into the convolutional neural network model, and obtains a grouping model after training;
    wherein the training samples are all or part of the plurality of sets of the image samples, and the grouping model is the goods identification model.

5. The goods sensing system based on image monitoring according to claim 1, wherein the model trainer comprises:
    a sample classifier that randomly divides the plurality of sets of the image samples into training samples and test samples;
    a grouping model trainer that inputs each sample image of a plurality of sets of the training samples and a group identification of each set of the training samples into the convolutional neural network model, and obtains a grouping model after training;

and a cross-validator that validates the grouping model according to each image of a plurality of sets of the test samples and a group identification of each set of the test samples, and calculates accuracy of the grouping model;

wherein when the accuracy of the grouping model is smaller than a preset threshold value, the plurality of sets of the image samples are randomly re-divided by the sample classifier;

and when the accuracy of the grouping model is greater than or equal to the preset threshold value, the grouping model is the goods identification model.

6. The goods sensing system based on image monitoring according to claim 4, wherein the grouping model trainer comprises:

a feature extractor that inputs an image of each training sample into the convolutional neural network to perform feature extraction and obtain a feature map;

a region proposal generator that inputs the image of each training sample into a region proposal network to generate a plurality of region proposals;

a region proposal mapper that maps the region proposals of the image of each training sample to the feature map of a last layer of convolution layers of the convolutional neural network;

and a classifier generator that collects the feature maps and the region proposals of images of the training samples, calculates proposal feature maps, and sends the proposal feature maps into a classifier network to generate a classifier.

7. The goods sensing system based on image monitoring according to claim 5, wherein the grouping model trainer comprises:

a feature extractor that inputs an image of each training sample into the convolutional neural network to perform feature extraction and obtain a feature map;

a region proposal generator that inputs the image of each training sample into a region proposal network to generate a plurality of region proposals;

a region proposal mapper that maps the region proposals of the image of each training sample to the feature map of a last layer of convolution layers of the convolutional neural network;

and a classifier generator that collects the feature maps and the region proposals of images of the training samples, calculates proposal feature maps, and sends the proposal feature maps into a classifier network to generate a classifier.

8. The goods sensing system based on image monitoring according to claim 5, wherein the cross-validator comprises:

a test sample inputter that inputs each image of the test samples into the grouping model to obtain test group identifications of the test samples;

and an accuracy calculator that compares, for each test sample, the test group identification of the test sample with the group identification of the test sample, and calculates a ratio of the number of the same identifications to the number of the test samples, wherein the ratio is the accuracy of the grouping model.

9. The goods sensing system based on image monitoring according to claim 1, wherein the group identification collector comprises:

a second feature extractor that inputs a real-time image into the convolutional neural network to perform feature extraction and obtain a feature map;

a second region proposal generator that inputs the real-time image into a region proposal network, and generates a plurality of region proposals;

a second region proposal mapper that maps the region proposals of the real-time image to the feature map of a last layer of the convolutional neural network;

and a group collector that collects the feature maps and region proposals of the plurality of real-time images, calculates proposal feature maps, sends the proposal feature maps into a classifier network and acquires the group identifications corresponding to the real-time images.

10. A method for goods sensing based on image monitoring, comprising:

collecting a plurality of sets of image samples, wherein each set of the image samples comprise a plurality of sample images of a type of goods at multiple angles, wherein a set of image samples of a same type of goods are provided with a same group identification, and the group identification is the type of the goods corresponding to the set of image samples;

training a convolutional neural network model according to each sample image in the plurality of sets of the image samples and a group identification of the sample image to obtain a goods identification model;

continuously acquiring at least one real-time image of space in front of a shelf, wherein each real-time image comprises a part or all of images of goods; and obtaining type and quantity of the goods displayed in the real-time image according to the real-time image and the goods identification model, further comprising:

inputting a plurality of real-time images into the goods identification model and obtaining a plurality of group identifications corresponding to the plurality of real-time images as a possibility conclusion; and calculating a ratio of the number of each group identification in the possibility conclusion to the total number of all group identifications in the possibility conclusion, wherein the ratio is a credibility of each group identification, and a type and/or quantity of the goods corresponding to a group identification with a maximum credibility are the type and/or the quantity of the goods displayed in the real-time images.

11. The method for goods sensing based on image monitoring according to claim 10, wherein training the convolutional neural network model comprises:

inputting each sample image of a plurality of sets of training samples and a group identification of each set of the training samples into the convolutional neural network model, and obtaining a grouping model after training;

wherein the training samples are all or part of the plurality of sets of the image samples, and the grouping model is the goods identification model.

12. The method for goods sensing based on image monitoring according to claim 10, wherein training the convolutional neural network model comprises:

randomly dividing the plurality of sets of the image samples into training samples and test samples;

inputting each sample image of a plurality of sets of the training samples and a group identification of each set of the training samples into the convolutional neural network model, and obtaining a grouping model after training; and validating the grouping model according to each image of a plurality of sets of the test samples and a group identification of each set of the test samples, and calculating accuracy of the grouping model;

wherein when the accuracy of the grouping model is smaller than a preset threshold value, the plurality of sets of the image samples are randomly re-divided into training samples and test samples; and when the accuracy of the grouping model is greater than or equal to the preset threshold value, the grouping model is the goods identification model.

13. The method for goods sensing based on image monitoring according to claim 11, wherein training the convolutional neural network model further comprises:

inputting an image of each training sample into the convolutional neural network, and performing feature extraction to obtain a feature map;

inputting the image of each training sample into a region proposal network to generate a plurality of region proposals;

mapping the region proposals of the image of each training sample to the feature map of a last layer of convolution layers of the convolutional neural network;

and collecting the feature maps and the region proposals of images of the training samples, calculating proposal feature maps, and sending the proposal feature maps into a classifier network to generate a classifier.

14. The method for goods sensing based on image monitoring according to claim 12, wherein training the convolutional neural network model further comprises:

inputting an image of each training sample into the convolutional neural network, and performing feature extraction to obtain a feature map;

inputting the image of each training sample into a region proposal network to generate a plurality of region proposals;

mapping the region proposals of the image of each training sample to the feature map of a last layer of convolution layers of the convolutional neural network;

and collecting the feature maps and the region proposals of images of the training samples, calculating proposal feature maps, and sending the proposal feature maps into a classifier network to generate a classifier.

15. The method for goods sensing based on image monitoring according to claim 12, wherein validating the grouping model comprises:

inputting each image of the test samples into the grouping model to obtain test group identifications of the test samples; and comparing, for each test sample, the test group identification of the test sample with the group identification of the test sample, and calculating a ratio of the number of the same identifications to the number of the test samples, wherein the ratio is the accuracy of the grouping model.

16. The method for goods sensing based on image monitoring according to claim 10, wherein obtaining the plurality of group identifications corresponding to the plurality of real-time images as the possibility conclusion comprises:

inputting a real-time image into the convolutional neural network, and performing feature extraction to obtain a feature map;

inputting the real-time image into a region proposal network, and generating a plurality of region proposals;

mapping the region proposals of the real-time image to the feature map of a last layer of the convolutional neural network;

and collecting the feature maps and region proposals of the plurality of real-time images, calculating proposal feature maps, sending the proposal feature maps into a classifier network and acquiring the group identifications corresponding to the real-time images.

17. A goods sensing apparatus, comprising:

a processor; and a memory configured to store instructions executable by the processor;

wherein the processor, upon execution of the instructions, is configured to:

collect a plurality of sets of image samples, wherein each set of the image samples comprise a plurality of sample images of a type of goods at multiple angles, wherein a set of the image samples of a same type of goods are provided with a same group identification, and the group identification is the type of the goods corresponding to the set of image samples;

train a convolutional neural network model according to each sample image in the plurality of sets of the image samples and a group identification of the sample image to obtain a goods identification model;

continuously acquire at least one real-time image of space in front of a shelf, wherein each real-time image comprises part or all of images of goods; and obtain a type and quantity of the goods displayed in the real-time image according to the real-time image and the goods identification model, further comprising:

input a plurality of real-time images into the goods identification model and obtain a plurality of group identifications corresponding to the plurality of real-time images as a possibility conclusion; and calculate a ratio of the number of each group identification in the possibility conclusion to the total number of all group identifications in the possibility conclusion, wherein the ratio is a credibility of each group identification, and a type and/or quantity of the goods corresponding to a group identification with a maximum credibility are the type and/or the quantity of the goods displayed in the real-time images.

18. The goods sensing apparatus according to claim 17, further comprising:

a first camera that shoots images of each goods at multiple angles and/or multiple distances; and a second camera that shoots the real-time image of the space in front of the shelf;

wherein the second camera is provided with a lens, and a field of view of the lens covers the space in front of the shelf.

* * * * *